(12) United States Patent
Nishikawa

(10) Patent No.: US 8,559,026 B2
(45) Date of Patent: Oct. 15, 2013

(54) IMAGE PROCESSING DEVICE HAVING PLURALITY OF CONTROL UNITS

(75) Inventor: Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 701 days.

(21) Appl. No.: 12/816,952

(22) Filed: Jun. 16, 2010

(65) Prior Publication Data
US 2011/0051166 A1     Mar. 3, 2011

(30) Foreign Application Priority Data

Aug. 31, 2009   (JP) ................ 2009-199892

(51) Int. Cl.
G06F 3/12    (2006.01)
G06F 1/00    (2006.01)
G06F 1/26    (2006.01)
G06F 1/32    (2006.01)

(52) U.S. Cl.
USPC ........... 358/1.13; 713/300; 713/320; 713/322

(58) Field of Classification Search
None
See application file for complete search history.

(56) References Cited

U.S. PATENT DOCUMENTS 6,711,447 B1    3/2004  Saeed
2004/0004732 A1  1/2004  Takeda et al.

FOREIGN PATENT DOCUMENTS

| JP | H08-101609 A | 4/1996 |
|---|---|---|
| JP | 2001-201986 A | 7/2001 |
| JP | 2004-034488 A | 2/2004 |
| JP | 2005-006110 A | 1/2005 |
| JP | 2005-267097 A | 9/2005 |
| JP | 2007-089265 A | 4/2007 |
| JP | 2008-166908 A | 7/2008 |

OTHER PUBLICATIONS

JP08101609-translation, Yamazaki, Apr. 16, 1996.*
JP2008166908-translation, Sadano, Jul. 17, 2008.*
Japan Patent Office, Office Action for Japanese Patent Application No. 2009-199892 (counterpart to above-captioned patent application), mailed Jul. 19, 2011.
Japan Patent Office, Office Action for Japanese Patent Application No. 2009-199892 (counterpart to above-captioned patent application), mailed Feb. 9, 2012.

* cited by examiner

Primary Examiner — Fan Zhang
(74) Attorney, Agent, or Firm — Baker Botts L.L.P.

(57) ABSTRACT

An image processing device includes a plurality of control units and an accepting unit. The plurality of control units are configured to execute each of a plurality of functions regarding image data, and include a first control unit and a second control unit. The accepting unit accepts a user's selection indicating a function selected by a user. When a control capability of the first control unit has decreased, the second control unit sets the selected function executable and sets the functions other than the selected function unexecutable.

5 Claims, 7 Drawing Sheets

```
< FUNCTION SELECTION SCREEN >
PLEASE SELECT FUNCTION TO EXECUTE IN SLEEP MODE

[ USE ]        [ FORCED USE * ]

PC PRINT             UNEXECUTABLE      UNEXECUTABLE

COPY                 UNEXECUTABLE      UNEXECUTABLE

SCANNER              UNEXECUTABLE           USE

FACSIMILE COMMUNICATION        USE                -

FACSIMILE PRINT      UNEXECUTABLE      UNEXECUTABLE

* PROCESSING SPEED MAY DECREASE
```

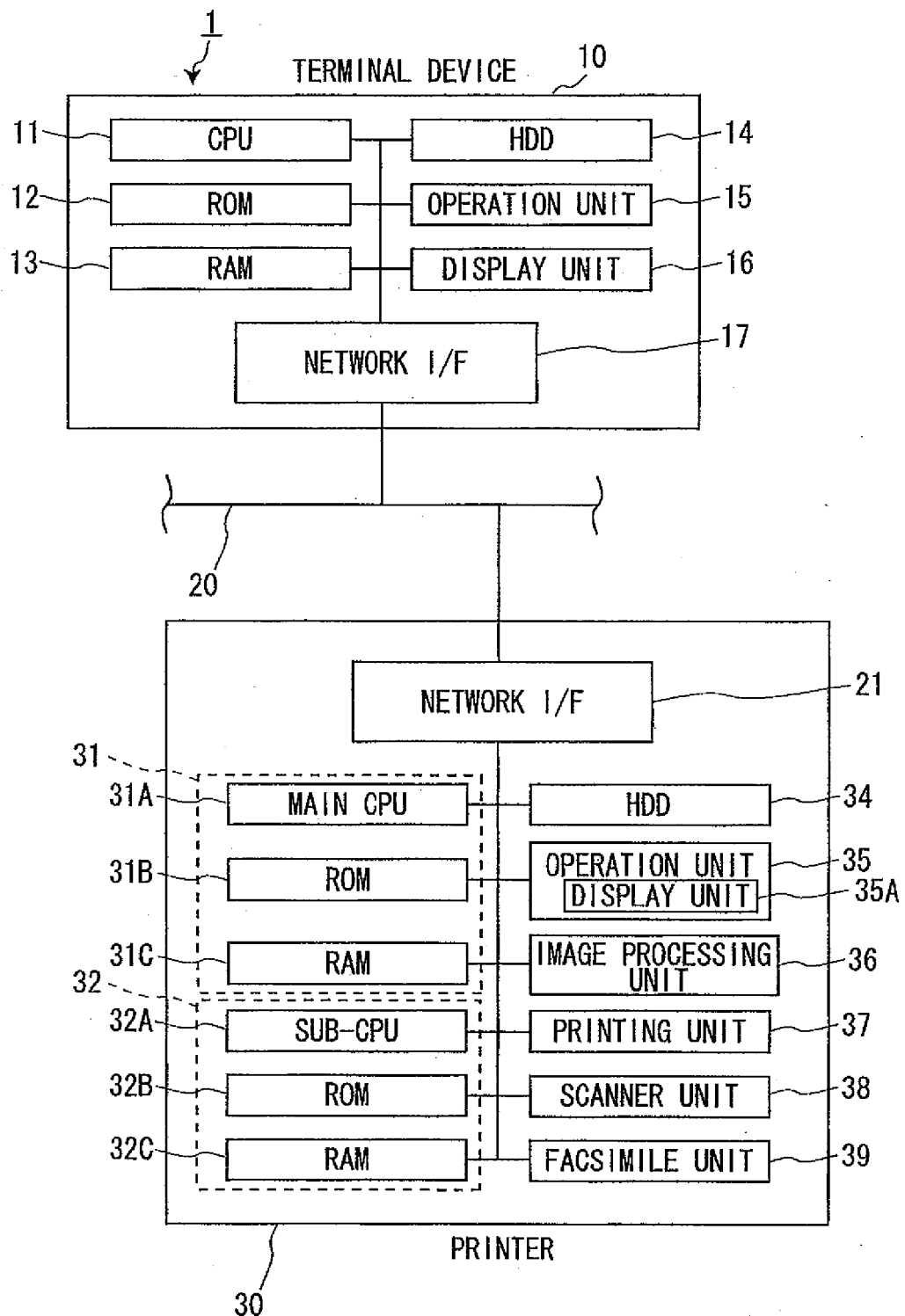

FIG.2

DEVICE TABLE

| DEVICE | SPECIFIC CLOCK NUMBER (MHz) | MINIMUM-REQUIRED CLOCK NUMBER (MHz) |
|---|---|---|
| PRINTING UNIT | 100 | 50 |
| IMAGE PROCESSING UNIT | 20 | 8 |
| FACSIMILE UNIT | 10 | 5 |
| OPERATION UNIT | 2 | 1 |
| SCANNER UNIT | 12 | 6 |
| NETWORK I/F | 1 | 0.5 |

FIG.3

FUNCTION TABLE

| FUNCTION | REQUIRED DEVICE |
|---|---|
| PC PRINT | PRINTING UNIT · IMAGE PROCESSING UNIT · NETWORK I/F |
| COPY | OPERATION UNIT · SCANNER UNIT · PRINTING UNIT · IMAGE PROCESSING UNIT |
| SCANNER | OPERATION UNIT · SCANNER UNIT |
| FACSIMILE COMMUNICATION | OPERATION UNIT · FACSIMILE UNIT |
| FACSIMILE PRINT | OPERATION UNIT · PRINTING UNIT |

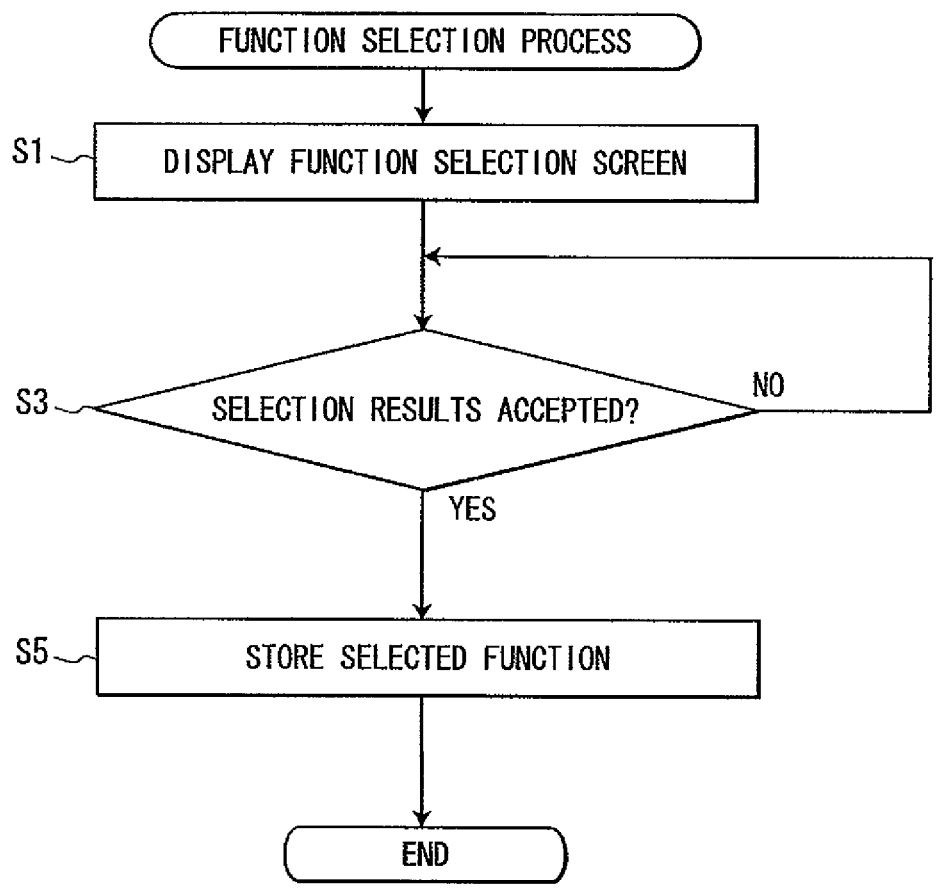

FIG.5

```
              < FUNCTION SELECTION SCREEN >
         PLEASE SELECT FUNCTION TO EXECUTE IN SLEEP MODE

[ USE ]           [ FORCED USE * ]

PC PRINT          UNEXECUTABLE         UNEXECUTABLE

COPY             UNEXECUTABLE         UNEXECUTABLE

SCANNER           UNEXECUTABLE              USE

FACSIMILE COMMUNICATION     USE                   -

FACSIMILE PRINT      UNEXECUTABLE         UNEXECUTABLE

* PROCESSING SPEED MAY DECREASE
```

FIG.7

SELECTION TABLE

| | |
|---|---|
| · PC PRINT | WORK_LOAD = 50 |
| · COPY | WORK_LOAD = 60 |
| · SCANNER | WORK_LOAD = 10 |
| · FACSIMILE COMMUNICATION | WORK_LOAD = 5 |
| · FACSIMILE PRINT | WORK_LOAD = 55 |
| · END | |

FIG.8

SELECTED FUNCTION TABLE

| |
|---|
| · FACSIMILE COMMUNICATION |
| · SCANNER |

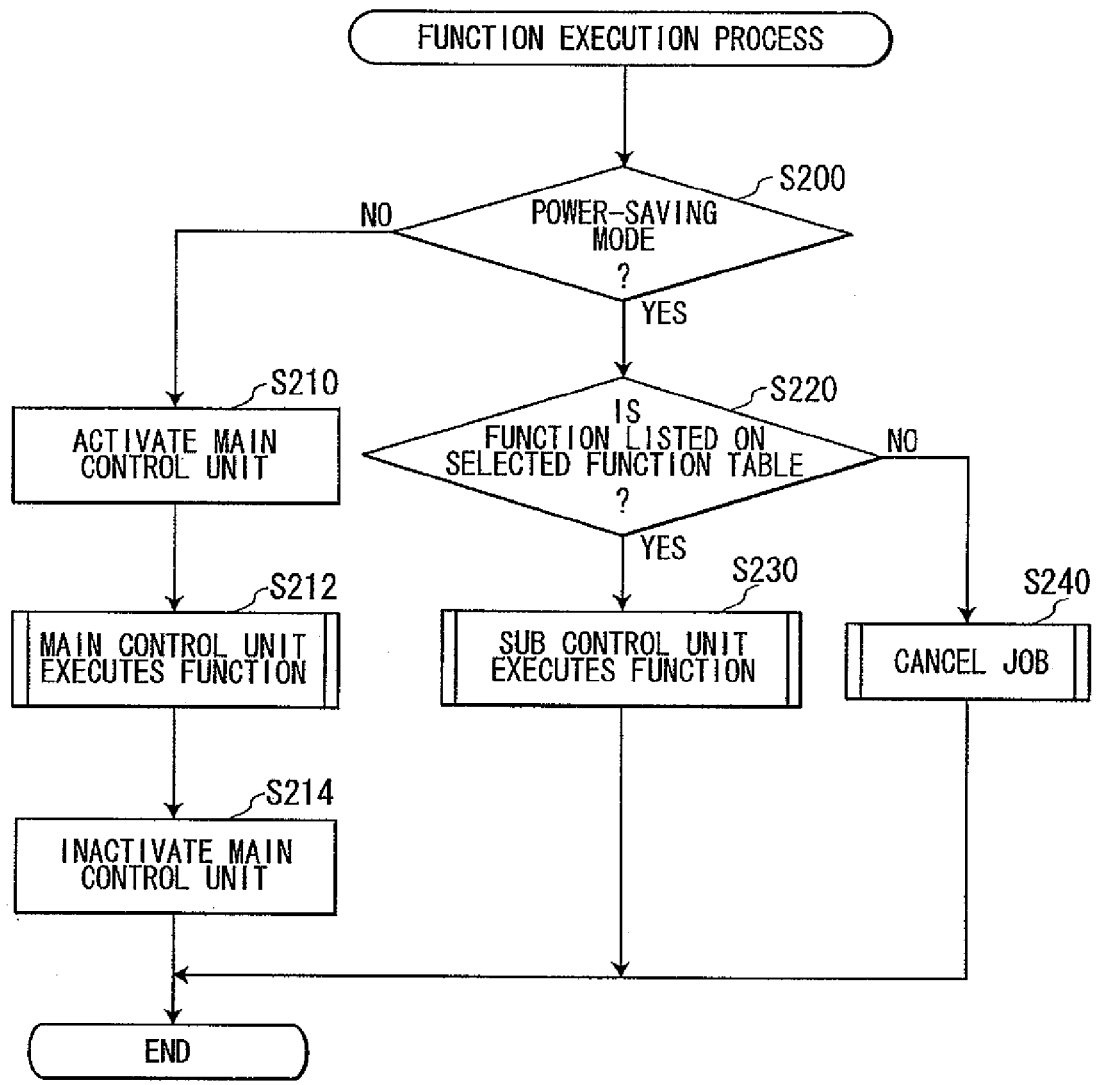

IMAGE PROCESSING DEVICE HAVING PLURALITY OF CONTROL UNITS

CROSS REFERENCE TO RELATED APPLICATION

This application claims priority from Japanese Patent Application No. 2009-199892 filed Aug. 31, 2009. The entire content of this priority application is incorporated herein by reference.

TECHNICAL FIELD

The present invention relates to an image processing device, a storage medium storing a control program for controlling the image processing device, and an image processing system including the image processing device.

BACKGROUND

Japanese Patent-Application Publication No. H8-101609 discloses an image processing device including a main control unit and a sub-control unit. The main control unit controls each of various units, such as a printer unit, and the sub-control unit controls an interface for communicating with external devices. During a power-saving mode, the main control unit is placed in a halt state, and only the sub-control unit is in a running state. This configuration reduces power consumption in the power-saving mode.

SUMMARY

However, because only predetermined functions can be executed under the control of the sub-control unit, the above configuration is not satisfactorily user friendly.

In view of the foregoing, it is an object of the invention to provide an image processing device capable of operating more conveniently when control capability of one or more of control units thereof has decreased. It is also an object of the invention to provide a storage medium storing a control program for controlling the image processing device and an image processing system including the image processing device.

In order to attain the above and other objects, the invention provides an image processing device including a plurality of control units and an accepting unit. The plurality of control units are configured to execute each of a plurality of functions regarding image data, and include at least a first control unit and a second control unit. The accepting unit accepts a user's selection indicating a function selected by a user. When a control capability of the first control unit has decreased, the second control unit sets the selected function executable and sets the functions other than the selected function unexecutable.

According to another aspect, the present invention provides a storage medium storing a set of program instructions executable on an image processing device including a plurality of control units executable a plurality of functions regarding image data and usable for controlling the image processing device. The plurality of control units include at least a first control unit and a second control unit. The instructions includes accepting a user's selection indicating a function selected by a user and controlling the second control unit to set the selected function executable and to set the functions other than the selected function unexecutable when a control capability of the first control unit has decreased.

According to still another aspect, the present invention provides an image processing system including an image processing device executable a plurality of functions regarding image data and an information processing device communicable with the image processing device. The image processing system includes a plurality of control units and an accepting unit. The plurality of control units are configured to execute each of the plurality of functions, and include at least a first control unit and a second control unit. The accepting unit accepts a user's selection indicating a function selected by a user. When a control capability of the first control unit has decreased, the second control unit sets the selected function executable and sets the functions other than the selected function unexecutable.

The present invention further provides an image processing device including a plurality of control units, an accepting unit, and a selecting unit. The plurality of control units are configured to execute each of a plurality of functions regarding image data, and include a first control unit and a second control unit having a lower performance level than the first control unit. The second control unit determines at least one selection candidate function from among the plurality of functions. The accepting unit accepts a user's selection indicating a function selected by a user from among the selection candidate function, and the selecting unit selects one of a normal mode and a power-saving mode. When the normal mode is selected, the second control unit sets each of the plurality of functions executable. When the power-saving mode is selected, the second control unit sets the selected function executable and sets the functions other than the selected function unexecutable.

BRIEF DESCRIPTION OF THE DRAWINGS

The particular features and advantages of the invention as well as other objects will become apparent from the following description taken in connection with the accompanying drawings, in which:

FIG. 1 is a block diagram showing an electrical configuration of an image processing system according to a first embodiment of the invention;

FIG. 2 is a view showing a device table according to the first embodiment of the invention;

FIG. 3 is a view showing a function table according to the first embodiment of the invention;

FIG. 4 is a flowchart representing a function selection process according to the first embodiment of the invention;

FIG. 5 is a view showing an example of a function selection screen displayed during the function selection process of FIG. 4;

FIG. 7 is a view showing a selection table according to the second embodiment of the invention;

FIG. 8 is a view showing a selected function table according to the second embodiment of the invention; and FIG. 9 is a flowchart representing a function execution process according to the second embodiment of the invention.

DETAILED DESCRIPTION

Figure 6:
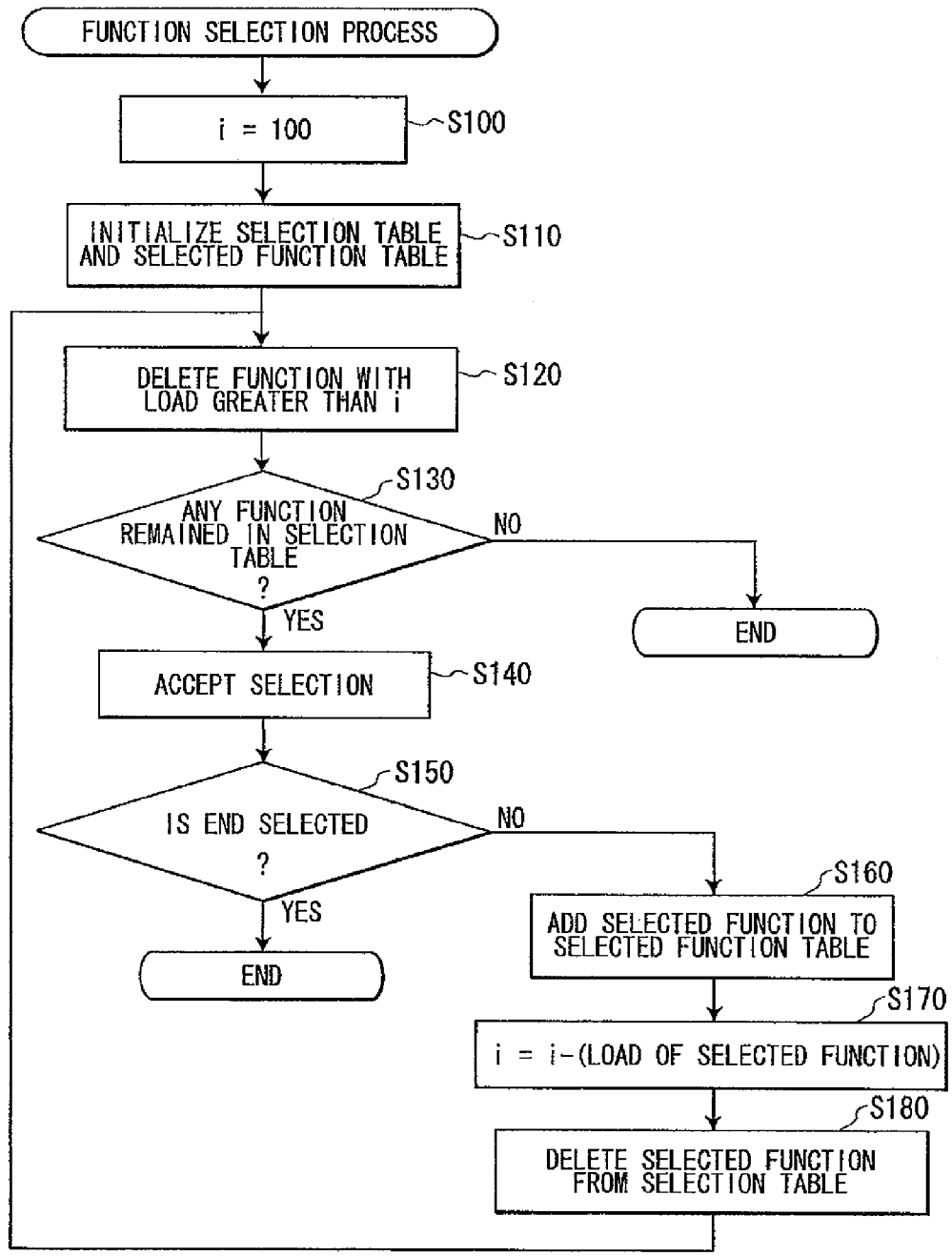
FIG. 6 is a flowchart representing a function selection process according to a second embodiment of the invention.

Image processing systems according to embodiments of the invention will be described, while referring to the accompanying drawings wherein like parts and components are designated by the same reference numerals to avoid duplicating description.

<First Embodiment>

As shown in FIG. 1, an image processing system 1 according to a first embodiment of the invention includes a terminal device 10 (information processing device) and a printer 30 (image processing device). The terminal device 10 may be a personal computer, for example.

The terminal device 10 includes a CPU 11, a ROM 12, a RAM 13, a hard disk drive (HDD) 14, an operation unit 15, a display unit 16, and a network interface (I/F) 17. Although not shown in the drawings, the operation unit 15 includes a keyboard and a pointing device, and the display unit 16 includes a liquid crystal display panel. The network I/F 17 is connected to a communication circuit 20. The HDD 14 stores various programs including an operation system (OS), an application software for generating image data to be printed, and a printer driver for controlling the printer 30. The CPU 11 performs overall control of the terminal device 10 based on a program read from the ROM 12 while storing processed results in the RAM 13.

The printer 30 is a multifunction device capable of executing a plurality of functions including a PC print function, a copy function, a scanner function, a facsimile communication function, and a facsimile print function. The printer 30 includes a main control unit 31, a sub-control unit 32, and a HDD 34. The main control unit 31 includes a main CPU 31A, a ROM 31B, and a RAM 31C. The sub-control unit 32 includes a sub-CPU 32A, a ROM 32B, and a RAM 32C.

Each of the ROM 31B and the ROM 32B stores various programs for controlling the printer 30. Each of the main CPU 31A and the sub-CPU 32A performs overall control of the printer 30 based on a program read from the respective ROM 31B, 32B while storing processed results into the respective RAM 31C, 32C.

The main control unit 31 has a higher performance level than the sub-control unit 32, and consumes more power than the sub-control unit 32. More specifically, the operating frequency of the main CPU 31A is 200 MHz, for example, and the operating frequency of the sub-CPU 32A is 10 MHz, for example. Also, the RAM 31C has a larger memory capacity than the RAM 32C. Accordingly, the main control unit 31 is capable of processing larger image data at a higher speed compared to the sub-control unit 32.

The printer 30 further includes various devices including an operation unit 35, an image processing unit 36, a printing unit 37, a scanner unit 38, a facsimile unit 39, and a network I/F 21. Although not shown in the drawings, the operation unit 35 includes various buttons through which a user inputs various commands including a print command. The operation unit 35 also includes a display unit 35A (liquid crystal display panel, for example) and a lamp (not shown), and is capable of displaying various setting screens and operation status.

The image processing unit 36 processes various image data. For example, the image processing unit 36 converts the image data into printable data. The image data may be scanned data generated by the scanner unit 38, print data received at the network I/F 21, or the like. The printing unit 37 forms an image on a recording medium (sheet of paper, OHP sheet, or the like) based on the image data in an electrophotographic method, an inkjet printing method, or the like. The network I/F 21 is connected to the terminal device 10 and the like through the communication circuit 20, enabling data communication therebetween.

The scanner unit 38 generates scanned data by scanning an original (not shown). The facsimile unit 39 transmits facsimile data to or receives facsimile data from a remote facsimile device (not shown).

FIG. 2 shows a device table, which is stored in the HDD 34, for example. The device table stores a specific clock number and a minimum-required clock number for each of the above-mentioned devices (i.e., the printing unit 37, the image processing unit 36, the facsimile unit 39, the operation unit 35, the scanner unit 38, and the network I/F 21) of the printer 30.

The specific clock number is an operating frequency required to operate a device at a processing speed with a quality level guaranteed according to the production specification. On the other hand, the minimum-required clock number is an operating frequency required to minimally operate a device although a processing speed and/or a quality level may decrease. As will be understood from FIG. 2, the main control unit 31 is capable of operating all of the devices at their specific clock numbers. On the other hand, the sub-control unit 32 cannot operate the printing unit 37, the image processing unit 36, and the scanner unit 38 at their specific clock numbers. However, the sub-control unit 32 is capable of operating the image processing unit 36 and the scanner unit 38 at their minimum-required clock numbers, and capable of operating the facsimile unit 39, the operation unit 35, and the network I/F 21 either at their specific clock numbers or their minimum-required clock numbers.

FIG. 3 shows a function table, which is stored in the HDD 34, for example. The function table identifies devices required for each function. Specifically, in the PC print function, the network I/F 21 receives print data from the terminal device 10, and the image processing unit 36 image-processes the print data (expands the print data into bitmap data, for example), and the printing unit 37 forms a print-object image on a recording medium. Thus, the network I/F 21, the image processing unit 36, and the printing unit 37 are required for the PC print function.

In the copy function, the operation unit 35 accepts a Copy request from a user, and the scanner unit 38 generates scanned data by scanning an original, and the image processing unit 36 image-processes the scanned data, and the printing unit 37 prints a scanned image on a recording medium. Thus, the operation unit 35, the scanner unit 38, the image processing unit 36, and the printing unit 37 are required for the copy function.

In the scanner function, the operation unit 35 accepts a scan request from a user, and the scanner unit 38 generates scanned data of an original. Thus, the operation unit 35 and the scanner unit 38 are required for the scanner function. In the facsimile communication function, the operation unit 35 accepts a facsimile communication request from a user, and the facsimile unit 39 exchanges facsimile data between a remote facsimile device. Thus, the operation unit 35 and the facsimile unit 39 are required for the facsimile communication function. In the facsimile print function, the operation unit 35 accepts a facsimile print request from a user, and the printing unit 37 forms a facsimile image on a recording medium. Thus, the operation unit 35 and the printing unit 37 are required for the facsimile print function.

The printer 30 has a normal mode and a power-saving mode (sleep mode). The printer 30 automatically enters the power-saving mode when a predetermined condition is met. The predetermined condition may be that a predetermined time duration elapses without any of user operation on the operation unit 35, reception of print data from the terminal device 10, and reception of facsimile data from a remote facsimile device is detected. The printer 30 returns to the normal mode when a user performs one of predetermined releasing operations on the operation unit 35 or the terminal device 10, for example.

In the normal mode, the main control unit 31 is in a running state and controls all of the devices, but the sub-control unit 32 is in a halt state. In the power-saving mode, on the other hand, the main control unit 31 is in the halt state, but the sub-control unit 32 is in the running state. Putting the main control unit 31 in the halt state effectively saves power during the power-saving mode.

In other words, when the predetermined condition is met, the printer 30 enters the sleep mode. That is, the main control unit 31 enters the halt state, and the sub-control unit 32 enters the running state. On the other hand, when one of the predetermined releasing operations is performed, then the printer 30 returns to the normal mode. That is, the main control unit 31 returns to the running state, and the sub-control unit 32 returns to the halt state. It should be noted that the sub-control unit 32 may alternatively enter the running state when the sub-control unit 32 detects that the main control unit 31 has entered the halt state. Detection on whether the main control unit 31 has entered the halt state may be made by detecting whether the control capability of the main control unit 31 has decreased. Also, the main control unit 31 in the halt state consumes less power than in the running state.

Next, a function selection process will be described with reference to the flowchart of FIG. 4. The function selection process is executed by the main CPU 31A of the main control unit 31 of the printer 30 based on a program stored in the ROM 31B when a user inputs a function selection request through manipulation on the operation unit 35 or the operation unit 15 of the terminal device 10.

In the function selection process, first in S1, the main CPU 31A controls the display unit 35A of the operation unit 35 or the display unit 16 of the terminal device 10 to display a function selection screen, prompting the user to select a function to be executed in the power-saving mode. An example of the function selection screen is shown in FIG. 5. (Hereinafter, the functions that can be executed in the power-saving mode under the control of the sub-control unit 32 will be referred to as "selection candidate"). More specifically, the function selection screen indicates whether each function can be executed at the specific clock number (high performance level) in a "USE" column, and whether each function can be executed at the minimum-required clock number (low performance level) in a "FORCED USE" column.

As described above, each of the PC print function, the copy function, and the facsimile print function requires the printing unit 37 to operate. However, the sub-control unit 32 cannot operate the printing unit 37 even at the minimum-required clock number (see FIG. 2). Thus, "UNEXECUTABLE" is placed in both columns for each of the PC print function, the copy function, and the facsimile print function.

The scanner function requires the scanner unit 38 and the operation unit 35 to operate. The sub-control unit 32 cannot operate the scanner unit 38 at the specific clock number, but can operate the same at the minimum-required clock number, and the sub-control unit 32 can operate the operation unit 35 either at the specific clock number or the minimum-required clock number. Thus, "UNEXECUTABLE" is placed in the "USE" column for the scanner function, but a user can select either "USE" or "NOT-USE" in the "FORCED USE" column for the scanner function. In the example shown in FIG. 5, "USE" is selected for the scanner function in the "FORCED USE" column.

The facsimile communication function requires the facsimile unit 39 and the operation unit 35 to operate. Because the sub-control unit 32 can operate either the facsimile unit 39 or the operation unit 35 either at the specific clock number or the minimum-required clock number, a user can select either "USE" or "NOT-USE" in both columns for the facsimile communication function. In the example shown in FIG. 5, "USE" is selected for the facsimile communication function in the "USE" column, so "–" is displayed in the "FORCED USE" column to indicate that selection cannot be made in this column.

Note that the main CPU 31A determines the selection candidates (i.e., whether or not each function is qualified as a selection candidate) based on all of the operating frequency of the sub-control unit 32, the device table (FIG. 2), and the function table (FIG. 3), and prepares the function selection screen based on the determination results, in S1.

In the following description, the function for which a user has selected "USE" in the function selection screen will be referred to as "selected function." In the example shown in FIG. 5, the scanner function and the facsimile communication function are selected functions.

In S3 of FIG. 4, the main CPU 31A determines whether or not selection results have been accepted. When the user performs a predetermined operation after making selection on the function selection screen, the main CPU 31A accepts the selection results, and a positive determination is made in S3 (S3:Yes). Then, in S5, the main CPU 31A stores the selection results into the HDD 34, for example, to set the selected functions, and ends the current process. Note that the main control unit 31, the operation unit 35, and the network I/F 21 together function as an accepting unit.

When the printer 30 enters the power-saving mode, the sub-control unit 32 retrieves the selection results from the HDD 34, sets the selected functions executable, and sets the remaining functions (unselected functions) unexecutable. As a result, an instruction input through the operation unit 35 to execute any unselected function in the power-saving mode is made invalid, for example.

Thus, when a user inputs a scan request through the operation unit 35 or the like in the power-saving mode, the sub-control unit 32 controls the scanner unit 38 to execute the scanner function although the processing speed may be lowered. Also, if a user inputs a facsimile communication request through the operation unit 35 or the like in the power-saving mode, then the sub-control unit 32 controls the facsimile unit 39 and the like to execute the facsimile communication function at the specific processing speed.

When a user performs one of the releasing operations as mentioned above, the sub-control unit 32 enters the halt state, and the main control unit 31 enters the running state, so all of the functions become executable.

As described above, according to the present embodiment, a user can select whether to use or not to use a function that can be executed when the printer 30 is in the power-saving mode. In the example shown in FIG. 5, both the scanner function and the facsimile communication function are selected to use. However, there may be a necessity to use both of the scanner function and the facsimile communication function at the same time. In this case, if the both functions are performed in parallel, the process speed of each function may decrease. On the other hand, if these functions are performed in series, then one function starts only after the other function finishes.

In order to overcome the above problem, a user may only select the scanner function as a selected function if the user wishes to use the scanner function in the power-saving mode. By doing so, the scanner function can be performed in the power-saving mode without influenced by execution of any other functions. In this mariner, according to the present embodiment, it is possible to enhance the convenience while saving power.

Because the selection candidates are limited to those that the sub-control unit 32 can execute, it is possible to prevent a user from selecting functions that the sub-control unit 32 cannot execute as functions to be executed in the power-saving mode. Also, because the selection candidates are determined based on their operating frequencies, the selection candidates can be determined accurately.

Also, the function selection screen shows functions such that a user can distinguish between functions executable at the high performance level in the power-saving mode and functions executable at the lower performance level in the power-saving mode. Thus, the user can easily select on the function selection screen functions to be executed in the power-saving mode.

<Second Embodiment>

Next, a second embodiment of the invention will be described. In the above-described first embodiment, the printer 30 automatically enters the power-saving mode when a predetermined condition is met, and the printer 30 returns to the normal mode when a user performs one of predetermined releasing operations on either the operation unit 35 or the terminal device 10, for example. However, in this second embodiment, the printer 30 waits for a function execution command always in the power-saving mode, regardless of whether or not the predetermined condition has been met, and when the predetermined condition is met, then the power-saving mode is recorded in a non-volatile memory (not shown). When a user performs one of predetermined releasing operations thereafter, then the normal mode is recorded in the non-volatile memory, but the printer 30 stays in the power-saving mode until a function execution command is received. In this manner, one of the normal mode and the power-saving mode is selected. This process to record (select) one of the normal mode and the power-saving mode may be performed by the sub-CPU 32A, for example.

Also, in this second embodiment, a function selection process shown in FIG. 6 is executed instead of that shown in FIG. 4, and a function execution process shown in FIG. 9 is executed. The sub-control unit 32 of this embodiment have either the same performance level as or different performance level than that of the above-described first embodiment, but the performance level of the sub-control unit 32 is less than that of the main control unit 31.

The function selection process shown in FIG. 6 will be described. In this process, first in S100, the sub-CPU 32A of the sub-control unit 32 initializes a variable i to 100, which indicates the maximum computation load that can be placed on the sub-CPU 32A. Next, in S110, the sub-CPU 32A initializes a selection table and a selected function table both stored in the HDD 34, for example. As shown in FIG. 7, the initialized selection table lists function selections for all of the functions of the printer 30 and also an end selection for ending the process. The selection table also shows work_load for each function. The work_load indicates a load placed on the sub-CPU 32A in executing a corresponding function either at a normal speed or a reduced speed (i.e., a ratio of the load in executing the corresponding function to the maximum computation load that can be placed on the sub-CPU 32A). More specifically, the work_load for each function is predetermined by the sub-control unit 32 based on the device table shown in FIG. 2, the function table shown in FIG. 3, and the performance level (operating frequency) of the sub-CPU 32A, and the selection table reflects this work_load. The work_load is preferably a load for a normal processing speed, but may be a load for a reduced processing speed if, for example, the work_load for the normal speed exceeds the maximum computation load that can be placed on the sub-CPU 32A. On the other hand, the initialized selected function table is cleared out.

Next, in S120, the sub-CPU 32A deletes from the selection table any of the function selections for the functions with the work_load greater than i. Then in S120 the sub-CPU 32A determines whether or not any function selection remains on the selection table.

If so (S130:Yes), then in S140, the sub-CPU 32A controls either the display unit 35A or 16 to display a selection screen reflecting the contents of the selection table, and prompts the user to make selection. Upon accepting the user's selection in S140, the sub-CPU 32A determines in S150 whether or not the user has selected the end selection. If so (S150:Yes), then the sub-CPU 32A ends the function selection process. On the other hand, if not (S150:No), this means that the user has selected one of the functions (function selections) listed on the selection table, and the sub-CPU 32A proceeds to S160.

In S160, the sub-CPU 32A adds the selected function to the selected function table. In S170, the sub-CPU 32A subtracts the work_load of the selected function from the value of the variable i. After deleting the selected function from the selection table in S180, the sub-CPU 32A returns to S120.

If it is determined in S130 that no function selections remain on the selection table (S130:No), then the sub-CPU 32A ends the function selection process. This configuration prevents the total work_load of the selected functions from exceeding the maximum computation load for the sub-CPU 32A.

As a result of the function selection process described above, the selected function table reflects selections made by the user. FIG. 8 shows an example of the selected function table which has been created by the user selecting the end selection after selecting the facsimile communication function and the scanner function in S140 of the function selection process.

Next, the function execution process according to the second embodiment will be described with reference to the flowchart of FIG. 9. The function execution process is performed upon receiving a function execution command. As described above, the printer 30 is in the power-saving mode at the beginning of the function execution process in this embodiment.

In the function execution process shown in FIG. 9, first in S200 the sub-CPU 32A determines whether or not the power-saving mode has been selected by the user by referencing the non-volatile memory (not shown). If not (S200:No), this means that the normal mode has been selected by the user, and in S210 the sub-CPU 32A activates the main control unit 31. More specifically, the sub-CPU 32A outputs an activation signal to the main CPU 31A, and the main CPU 31A enters the running state from the halt state upon receiving the activation signal. Next in S212 the main control unit 31 executes a function corresponding to the function execution command. Then, in S214, the main CPU 31A enters the halt state, returning the printer 30 to the sleep mode, and the sub-CPU 32A ends the function execution process.

However, if a positive determination is made in S200 (S200:Yes), then the sub-CPU 32A determines whether or not the function corresponding to the function execution command is listed on the selected function table. If so (S230:Yes), then the sub-control unit 32 executes the function in S230 at either the normal processing speed or the reduced processing speed and ends the function execution process. On the other hand, if not (S220:No), then the sub-CPU 32A executes a job canceling process in S240 for notifying the user that the function is not executable and for canceling a job corresponding to the function execution command. Then, the sub-CPU 32A ends the function execution process.

Thus, according to the present embodiment, if the normal mode has been selected by a user, then each of the functions is set executable. On the other hand, if the power-saving mode has been selected by the user, then only function(s) selected by the user is set executable, and remaining functions are set unexecutable.

<Modifications>

While the invention has been described in detail with reference to the embodiment thereof, it would be apparent to those skilled in the art that various changes and modifications may be made therein without departing from the spirit of the invention.

For example, in the above-described embodiments, the printer 30 which is a multifunction device is described as an example of image processing device. However, the image processing device is not limited to the printer 30, but may be a printer without scanner function or facsimile function, a facsimile device, or an image processing device, as long as the device can execute a plurality of functions regarding image data.

In the above-described embodiments, the copy function, the scanner function, the facsimile communication function and the like are described as functions of the image processing device. However, this is not limitation of the invention. The image processing device may have an image storing function for storing image data into the HDD 34 and/or a specific image extracting function for extracting a specific image from scanner data, for example, as long as the function is to be executed on image data.

In the above-described embodiment, entering the power-saving mode is described as an example of a case where the control capability of a control unit (main control unit 31) decreases. However, this is not limitation of the invention. The control capability of the main control unit 31 may also decrease when the main control unit 31 starts malfunctioning (including going out of control). In this case, it is conceivable to provide a detecting unit (watch dog, for example) that detects whether or not the main control unit 31 is running normally based on a number of clocks output from the main control unit 31, and to detect whether or not the main control unit 31 is malfunctioning based on the detection results.

In the above-described first embodiment, the sub-control unit 32 is in the halt state when the printer 30 is in the normal mode. However, the sub-control unit 32 may be in the running state when the printer 30 is in the normal mode. In this case, the sub-control unit 32 may execute the function selection process described above.

In the above-described first embodiment, the function selection process is executed by the main CPU 31A of the printer 30. However, the CPU 11 of the terminal device 10 may execute the function selection process instead.

In the above-described first embodiment, the function selection process is executed when the printer 30 is in the normal mode. However, the function selection process may be executed when the predetermined condition to enter the power-saving mode is met or during the power-saving mode. In the former case, it is conceivable to display the function selection screen when the predetermined condition to enter the power-saving mode is met and to enter the power-saving mode when a user performs function selection on the function selection screen. In the latter case, it is conceivable to display the function selection screen when a user inputs an execution command for a particular function, such as the scanner function, in the power-saving mode, so as to prompt the user to make the function selection on the function selection screen.

In either case, the selection candidate may be determined based on the control capability of the sub-control unit 32 at that time (remaining control capability (remaining clock number) if any other function is being executed).

In the above-described embodiments, the printer 30 includes two control units, i.e., the main control unit 31 and the sub-control unit 32. However, the printer 30 may include three or more control units.

In the above-described first embodiment, the selection candidates are determined based on the operating frequency of the sub-control unit 32. However, the selection candidates may be determined based on the memory capacities of the RAMs 31C and 32C of the main control unit 31 and the sub-control unit 32.

What is claimed is:

1. An image processing device comprising:
   a plurality of control units configured to execute each of a plurality of functions regarding image data, the plurality of control units including at least a first control unit and a second control unit; and
   an accepting unit that accepts a user's selection indicating a function selected by a user, wherein:
   when a control capability of the first control unit has decreased, the second control unit sets the selected function executable and sets the functions other than the selected function unexecutable, wherein:
   at least one of the plurality of control units enables a user to select the function from among a selection candidate function determined by the at least one of the plurality of control units, the selection candidate function being a function that at least one control unit other than the first control unit is capable of executing; wherein
   the selection candidate function includes a first selection candidate and a second selection candidate;
   the at least one of the plurality of control units determines the first selection candidate that the at least one control unit other than the first control unit is capable of executing at a higher performance level;
   the at least one of the plurality of control units determines the second selection candidate that the at least one control unit other than the first control unit is capable of executing at a lower performance level; and
   the at least one of the plurality of control units controls a display unit to display the first and second selection candidates such that the first and second selection candidates are distinguishable from each other.

2. The image processing device according to claim 1, wherein the at least one of the plurality of control units determines the selection candidate function based on an operating frequency of the at least one control unit other than the first control unit.

3. The image processing device according to claim 1, wherein the control capability of the first control unit decreases when the first control unit enters a halt state.

4. The image processing device according to claim 1, wherein:
   the first control unit consumes more power than the second control unit;
   the first control unit in the halt state consumes less power than in a running state; and
   the second control unit is in the halt state when the first control unit is in the running state, and is in the running state when the first control unit is in the halt state.

5. A non-transitory storage medium storing a set of program instructions executable on an image processing device including a plurality of control units executable a plurality of functions regarding image data and usable for controlling the image processing device, the plurality of control units including at least a first control unit and a second control unit, the instructions comprising:
- accepting a user's selection indicating a function selected by a user; and
- controlling the second control unit to set the selected function executable and to set the functions other than the selected function unexecutable when a control capability of the first control unit has decreased;
- enabling a user to select the function from among a selection candidate function determined by the at least one of the plurality of control units, the selection candidate function being a function that at least one control unit other than the first control unit is capable of executing, wherein the selection candidate function includes a first selection candidate and a second selection candidate;
- determining the first selection candidate that the at least one control unit other than the first control unit is capable of executing at a higher performance level;
- determining the second selection candidate that the at least one control unit other than the first control unit is capable of executing at a lower performance level; and
- controlling a display unit to display the first and second selection candidates such that the first and second selection candidates are distinguishable from each other.

* * * * *